United States Patent [19]

Whitney

[11] 4,386,468

[45] Jun. 7, 1983

[54] AUTOMOBILE FRAME ALIGNING DEVICE

[76] Inventor: Walter D. Whitney, 1420 Industrial Rd., San Carlos, Calif. 94070

[21] Appl. No.: 198,783

[22] Filed: Oct. 20, 1980

[51] Int. Cl.³ ............................................. G01B 5/255
[52] U.S. Cl. ............................ 33/180 AT; 33/203.12; 33/203.17; 33/203.21
[58] Field of Search ........... 33/203.12, 203.17, 203.21, 33/203, 288, 181 AT, 180 AT, 335, 203.15, 174 L

[56] References Cited

U.S. PATENT DOCUMENTS

| | | | |
|---|---|---|---|
| 2,853,794 | 9/1958 | Van Winkle | 33/203.17 |
| 3,292,268 | 12/1966 | Knight | 33/203.12 X |
| 3,805,396 | 4/1974 | Hunnicutt | 33/180 AT |
| 3,869,804 | 3/1975 | Friend | 33/288 |
| 4,165,567 | 8/1979 | Olsson | 33/288 |
| 4,242,803 | 1/1981 | Dory | 33/180 AT |

*Primary Examiner*—William D. Martin, Jr.
*Attorney, Agent, or Firm*—Gordon Wood

[57] ABSTRACT

A device adapted to be employed in connection with the repair of damaged automobiles and the like wherein deformed portions of the automobile may be accurately returned to their original shape and position. A base is provided which may partially extend under an automobile and is provided with a vertically extending support on which one or more scales may be supported for vertical, horizontal and swingable movement relative to the support whereby the correct distance between two points may be readily set by a scale and repeated to assist in determining the amount a damaged portion must be bent or stretched to return it to its proper original position. By combining two devices, each including a base and a vertically extending support, accurate readings may be made very quickly with a relatively great saving in time. Portions of the device may be inverted to permit accurate measurement of distances from above rather than from below the body.

2 Claims, 5 Drawing Figures

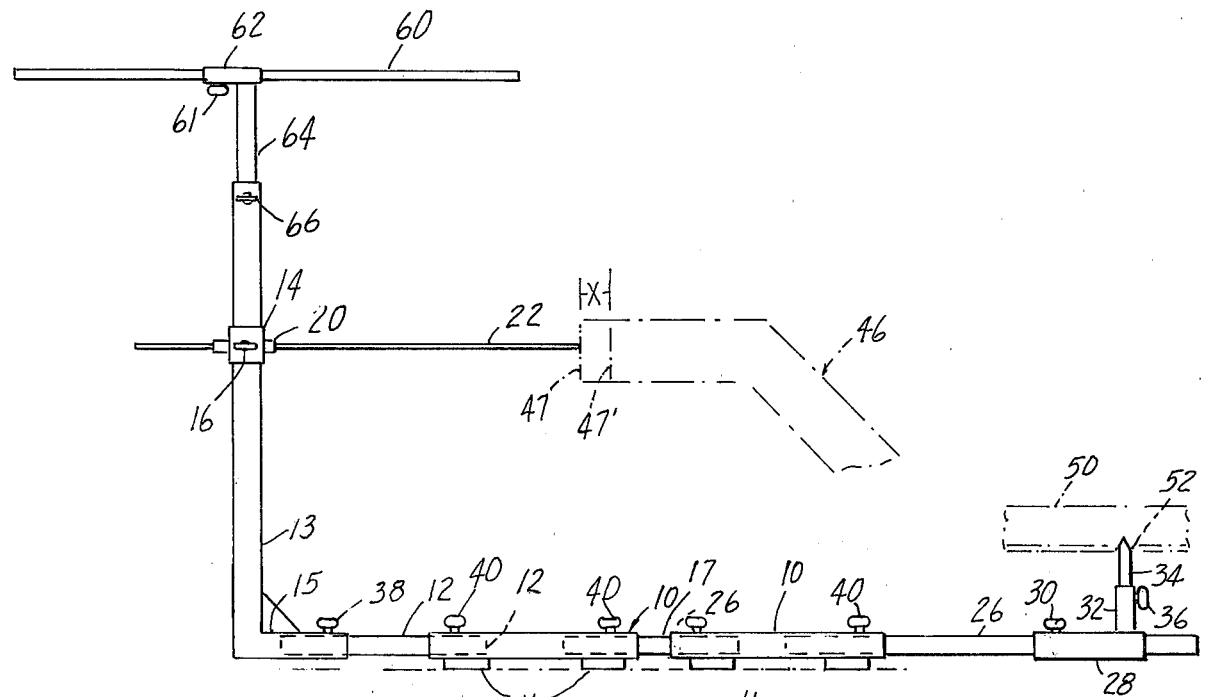
Fig. 1.
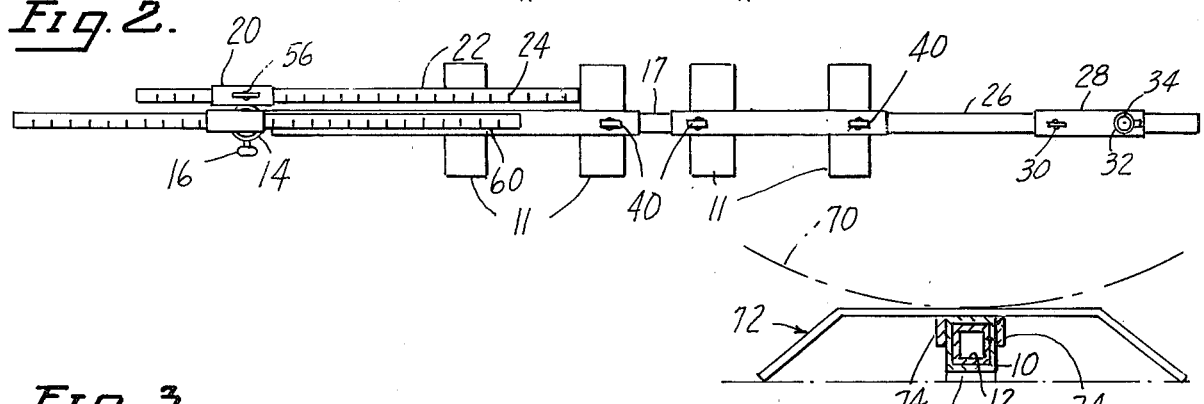
Fig. 2.
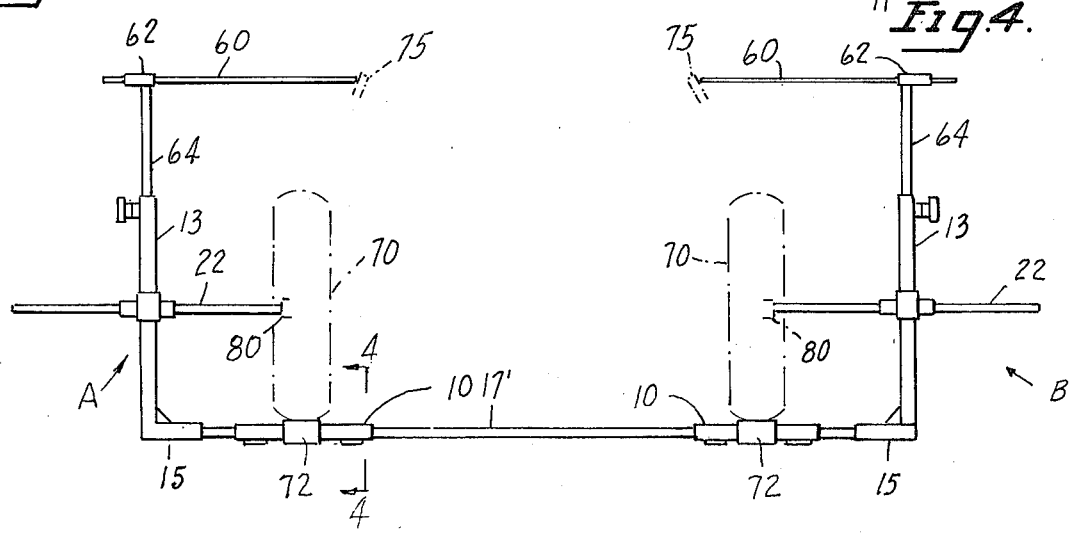
Fig. 3.
Fig. 4.

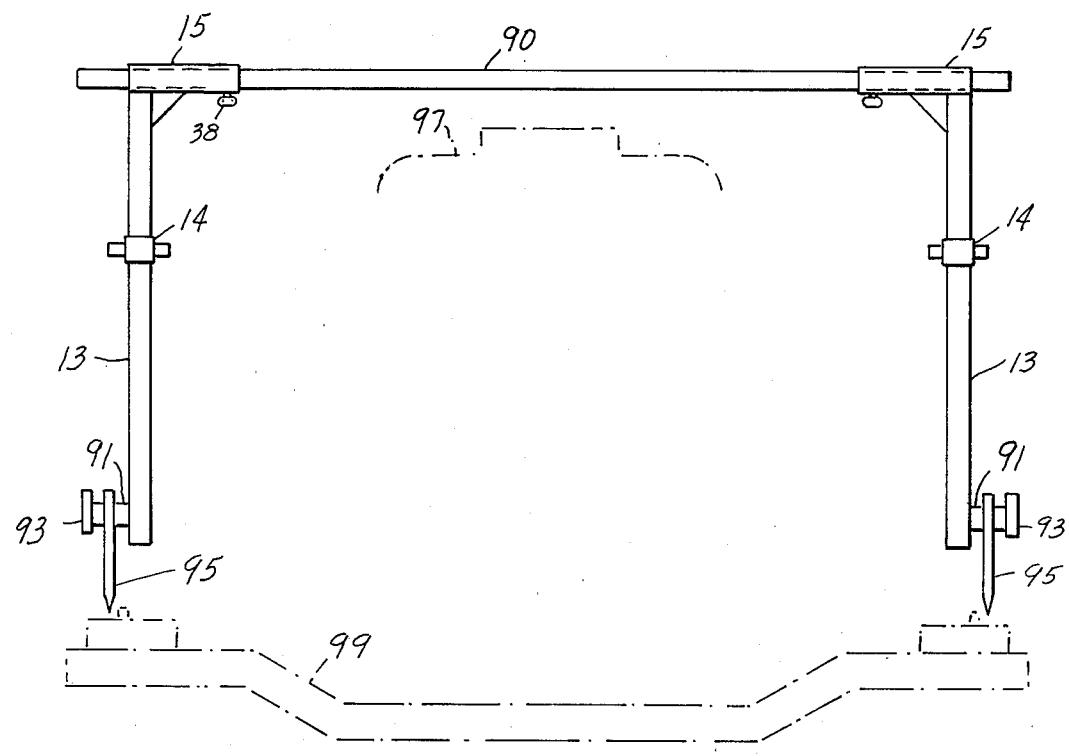

AUTOMOBILE FRAME ALIGNING DEVICE

This invention relates to a device for assisting in the work of returning various parts of an automobile to their proper positions after the same have been damaged.

When it is desired to bend or stretch portions of an automobile body or frame back to their proper positions after the same have been damaged, no satisfactory tool is presently available to permit accurate and speedy determination of the amount that parts must be deformed from their damaged condition to their proper positions. Measuring distances on an automobile is extremely difficult in most cases because of the many interfering parts which exist between the two points between which a measurement is desired. Furthermore, when it is necessary to add or subtract distances to arrive at a proper measurement between parts an opportunity for error exists which may result in a great waste of time.

The main object of the present invention is to provide a device for measuring distances with respect to the frame and body of an automobile and which device is extremely accurate and may be employed to determine necessary distances in a minimum length of time.

Other objects and advantages will be apparent from the following specification and from the drawings.

FIG. 1 is a side elevation of one form of the invention showing the same in use in cooperation with portions of an automobile shown schematically.

FIG. 2 is a top plan view of the apparatus of FIG. 1.

FIG. 3 is a side elevation of the preferred form of the invention in which two of the devices of FIG. 1 are employed.

FIG. 4 is a section taken in a plane indicated by lines 4—4 in FIG. 3.

FIG. 5 is a view similar to FIG. 3 but showing another method of using the device.

In detail, and first with reference to FIG. 1, in one form of the invention there are provided a pair of elongated tubular members 10 preferably of rectangular cross section and provided along their lower sides with a pair of spaced apart feet 11 to engage a supporting surface. Telescopically received within the left hand tubular base member 10 is a smaller tube 12 of similar cross section and to the other end of which is slidably secured a tubular member 15 similar to base member 10. Welded at its lower end to member 15 is an upright support member 13 preferably of pipe. Slidably supported on support 13 is a relatively short pipe sleeve 14 which may be adjustably secured at any point along the length of support 13 by thumb screw 16.

Fixedly secured as by welding to sleeve 14 is a horizontally extending sleeve 20 of rectangular cross section which is adapted to slidably receive therein an elongated scale 22 which is provided along its length with suitable measuring indicia 24 (FIG. 2).

The base members 10 are adjustably connected together by tubular member 17.

At the end of the right hand tubular base 10 is an elongated tubular member 26 of rectangular cross section which is slidably received within the adjacent base 10 and which is provided with a slidable sleeve 28 which may be adjustably secured along the length of member 26 by means of thumb screw 30.

Also received on sleeve 28 is an upstanding tubular support 32 in which is received a pointer or marker 34 which may be adjustably positioned along the length of sleeve 32 by means of thumb screw 36.

It will be apparent from FIG. 1 that tubular members 10, 12, 15, 26 may be fixedly but releasably secured relative to the tubular bases 10 by means of thumb screws 30, 38, 40 so that the distance between vertical support 13 and pointer or marker 34 may be set at any desired distance throughout a considerable range.

As an example of one of the many uses of the above described apparatus, there is indicated in FIG. 1 a frame member generally designated 46 that may have a damaged end 47, for example. By aligning pointer 34 with a portion of an undamaged frame member such as indicated at 50, a reference point such as hole 52 may be employed to establish one end of the device. In the usual case where one side of the frame is undamaged the scale 22 may be set relative to the entire device by means of thumb screw 56 (FIG. 2) and the end of said scale may be made to touch the undamaged portion 47 of the undamaged frame 46. The entire device may then be swung around pointer 34 so that the outer end of scale 22 may be registered with the damaged frame 46. As indicated in FIG. 1, the damaged end 47' may then be pulled back the distance X to register with the outer end of scale 22 and therefore establish its exact correct position.

In the example given above it will be apparent that the device may be employed to measure a distance on one undamaged side of the automobile frame and then be entirely translated over to the other side of the automobile to make the appropriate measurement on the damaged side. In other words, the device of FIG. 1 may be swung about the indicator 34 or translated from one side of the automobile depending on which operation is more convenient.

The structure of FIG. 1 may be made substantially more flexible by providing another scale 60 above scale 22. As seen in FIG. 1, the scale 60 is preferably slidably secured by thumb screw 61 within a rectangular sleeve 62 which in turn is secured to the upper end of a vertically extending pipe 64 which is telescopically received within pipe support 13. By releasably securing pipe 64 to support 13 by means of thumb screw 66 it will be apparent that the upper scale 60 may be positioned relative to the lower scale 22 so that an accurate measurement determined by the working ends of scales 22, 60 may be made at various elevations regardless of any obstruction that exists between the two scales. In other words, scale 22 may be placed relative to an undamaged portion of the frame or body and scale 60 may be positioned relative to another undamaged portion so that the assembly may be moved from one side of the automobile to the damaged side so as to determine by scale 60 the amount which the damaged portion must be moved to place it in its proper position. This last mentioned use of the invention is best illustrated in the preferred form shown in FIG. 3.

In the FIG. 3 structure two of the assemblies shown in FIG. 1 are employed together with the sleeve 28 and piece 26 removed. Thus, as best seen in FIG. 3, identical assemblies A and B may be connected together by means of an elongated tubular member 17'. As an example of one of the many uses of the assembly of FIG. 3 the wheels 70 of an automobile are indicated and which wheels may be supported on ramps 72 which are formed as best seen in FIG. 4 to extend over the base 10 and which are provided with downwardly extending lugs 74 for straddling said base 10 to properly position the wheels relative to the assemblies A and B. Assuming that one of the two "Macpherson struts" is damaged the A assembly may be positioned relative to the undamaged Macpherson strut with the scale 22 engaging the outer end of the wheel hub 80 with the grease cap removed. The scale 60 may then be employed to engage one portion 75 of the upper end of the Macpherson strut assembly in order to give the relative distances between the hub 80 and the upper end portion of the undamaged Macpherson strut. It is then a simple matter to set scales 22, 26 of assembly B at the same scale readings as in assembly A in order to determine the amount that the upper end of the damaged Macpherson strut is deformed from its correct position. It will be apparent that this measurement can be done in a matter of a few minutes and at the same time obtain extreme accuracy. It will also be apparent that the example of FIG. 3 is only one of many applications of the above described device.

The above noted design of support members 13 permits the use of the same in another important and desirable procedure which is illustrated in FIG. 5. In this case the two support members 13 are inverted and slidably connected together by means of a relatively long tubular member 90.

Fixedly secured as by welding to the outer sides of members 13 adjacent their free ends are internally threaded bosses 91 which are adapted to receive therein the externally threaded shanks of T-bolts 93 so that an elongated apertured pointer 95 may be releasably secured to each support 13.

An automobile engine is indicated by dot-dash lines 97 in FIG. 3, and it will be seen that the device may be placed over the engine so that pointers 95 register with similar corresponding points on the opposite sides of a frame member indicated at 99. By reference to a frame manual the correct distance between such similar corresponding points may be determined and such distance quickly and easily compared to the distance between pointers 95 thus giving the amount such two points vary from the correct distance.

I claim:

1. A frame aligning device for damaged automobile bodies and frames comprising:
   a pair of axially aligned horizontally disposed tubular sleeves,
   elongated elements telescopically received within the opposite ends of said sleeves,
   a vertically extending elongated support connected at its lower end to one of said elements that is received in one of said sleeves,
   a pair of vertically spaced apart elongated horizontally extending indicators on said support,
   a third indicator carried by another of said elements that is received in the distal end of the other of said sleeves, and
   adjusting means on said sleeves for adjusting the effective distance between said third indicator and said support and,
   ramp means on each of said sleeves to receive a vehicle wheel thereon.

2. A device according to claim 1 wherein a fourth indicator is carried by said another of said elements to provide a pair of vertically spaced apart indicators similar to said pair on said support.

* * * * *